United States Patent
Beauvais

(10) Patent No.: US 10,145,418 B2
(45) Date of Patent: Dec. 4, 2018

(54) BEARING ASSEMBLY WITH INNER RING AND LUBRICATION THEREFOR

(71) Applicant: PRATT & WHITNEY CANADA CORP., Longueuil (CA)

(72) Inventor: Gilles Beauvais, Montreal (CA)

(73) Assignee: PRATT & WHITNEY CANADA CORP., Longueuil (CA)

(*) Notice: Subject to any disclaimer, the term of this patent is extended or adjusted under 35 U.S.C. 154(b) by 0 days.

(21) Appl. No.: 15/189,450

(22) Filed: Jun. 22, 2016

(65) Prior Publication Data

US 2017/0370413 A1   Dec. 28, 2017

(51) Int. Cl.
| | |
|---|---|
| F16C 33/66 | (2006.01) |
| F16C 33/58 | (2006.01) |
| F16C 19/22 | (2006.01) |
| F16C 19/36 | (2006.01) |

(52) U.S. Cl.
CPC ........ *F16C 33/6677* (2013.01); *F16C 19/225* (2013.01); *F16C 19/36* (2013.01); *F16C 33/585* (2013.01); *F16C 33/6681* (2013.01); *F16C 2300/22* (2013.01); *F16C 2360/23* (2013.01)

(58) Field of Classification Search
CPC .... F16C 33/586; F16C 33/60; F16C 33/6674; F16C 33/6677; F16C 33/6681; F16C 2360/23
See application file for complete search history.

(56) References Cited

U.S. PATENT DOCUMENTS

| | | | | |
|---|---|---|---|---|
| 4,194,797 A | * | 3/1980 | Hormann | F16C 33/6677 29/898.066 |
| 4,334,720 A | | 6/1982 | Signer | |
| 4,400,040 A | | 8/1983 | Toth et al. | |
| 4,428,628 A | * | 1/1984 | Brown | F16C 19/28 384/467 |
| 8,517,612 B2 | | 8/2013 | Metzger et al. | |
| 8,616,777 B1 | | 12/2013 | Smith et al. | |
| 2006/0062504 A1 | * | 3/2006 | Wilton | F01D 25/18 384/475 |
| 2006/0193545 A1 | | 8/2006 | Bridges et al. | |

* cited by examiner

*Primary Examiner* — James Pilkington
(74) *Attorney, Agent, or Firm* — Norton Rose Fulbright Canada LLP

(57) ABSTRACT

A bearing assembly comprises an outer ring and an inner ring radially inward of the outer ring and cooperating therewith to form a roller volume. The inner ring has opposed faces including slots extending axially and circumferentially spaced. The slots extend axially to openings into the opposed axial faces and communicate with partial circumferential slots in the inner circumferential surface and in fluid communication with the roller volume through passages in the inner ring. A first plurality of the axial slots has a radial depth increasing from a first of the axial faces to the respective partial circumferential slot. A second plurality of the axial slots has a radial depth increasing from the second of the axial faces to the respective partial circumferential slot. Bearing elements are in the roller volume rollingly disposed against the outer ring and the inner ring.

18 Claims, 5 Drawing Sheets

BEARING ASSEMBLY WITH INNER RING AND LUBRICATION THEREFOR

TECHNICAL FIELD

The application relates generally to bearing assemblies and, more particularly, to an inner ring for such an assembly.

BACKGROUND OF THE ART

To reduce wear on bearing assemblies such as those used in gas turbine engines, lubricating fluid such as oil is typically used to keep them cool and lubricate them. In particular, some of these bearing may be high-speed bearings, whereby adequate lubricating may increase their durability. Lubricating fluid (i.e., lubricant such as may be delivered by being channeled under the bearing, for example through circular axial slots formed on an inside surface of an inner ring of the bearing assembly, with radial holes extending through the inner ring to intersect the axial slots. The axial slots may be provided with an angle relative to a rotational axis of the component supported by the bearing, to enhance flow of the lubricant to the radial holes. However, because of the angulation of axial slots, the bearing has an orientation, and it is misoriented, the angulation of the axial slots may hamper the flow of lubricant to the radial holes.

SUMMARY

In one aspect, there is provided a bearing assembly comprising: an outer ring defining a central axis of rotation for the bearing assembly; an inner ring disposed radially inwardly of the outer ring and cooperating therewith to form a roller volume, the inner ring having opposed axial faces and including axial slots formed in, extending axially along and circumferentially spaced around an inner circumferential surface, each said axial slots extending axially to openings into the opposed axial faces of the inner ring and communicating with a respective partial circumferential slot defined in the inner circumferential surface and being in fluid communication with the roller volume through a respective passage in the inner ring, a first plurality of the axial slots having a radial depth increasing from a first of the axial faces to at least the respective partial circumferential slot, and a second plurality of the axial slots having a radial depth increasing from the second of the axial faces to at least the respective partial circumferential slot; and bearing elements in the roller volume rollingly disposed against an inner circumferential surface of the outer ring and an outer circumferential surface of the inner ring, the bearing elements allowing relative rotational motion between the outer ring and the inner ring.

In another aspect of the present disclosure, there is provided an inner ring of a bearing assembly comprising a ring body configured to be disposed radially inwardly of an outer ring of the bearing assembly and cooperating therewith to form a roller volume configured for receiving roller bearing elements allowing relative rotational motion between the outer ring and the inner ring, the inner ring having opposed axial faces and including axial slots formed in, extending axially along and circumferentially spaced around an inner circumferential surface of the ring body, each said axial slots extending axially to openings into the opposed axial faces of the inner ring and communicating with a respective partial circumferential slot defined in the inner circumferential surface and being in fluid communication with the roller volume through a respective passage in the inner ring, a first plurality of the axial slots having a radial depth increasing from a first of the axial faces to at least the respective partial circumferential slot, and a second plurality of the axial slots having a radial depth increasing from the second of the axial faces to at least the respective partial circumferential slot.

In yet another aspect of the present disclosure, there is provided a method of lubricating a bearing assembly comprising: circulating a lubricating fluid axially and radially outwardly along a first plurality of axial slots in an inner surface of an inner ring of the bearing assembly to distally-located partial circumferential slots in the inner ring; and circulating the lubricating fluid axially and radially inwardly along a second plurality of axial slots in the inner surface of the inner ring of the bearing assembly to proximally-located partial circumferential slots in the inner ring.

DESCRIPTION OF THE DRAWINGS

Reference is now made to the accompanying figures in which.

DETAILED DESCRIPTION

Figure 1:
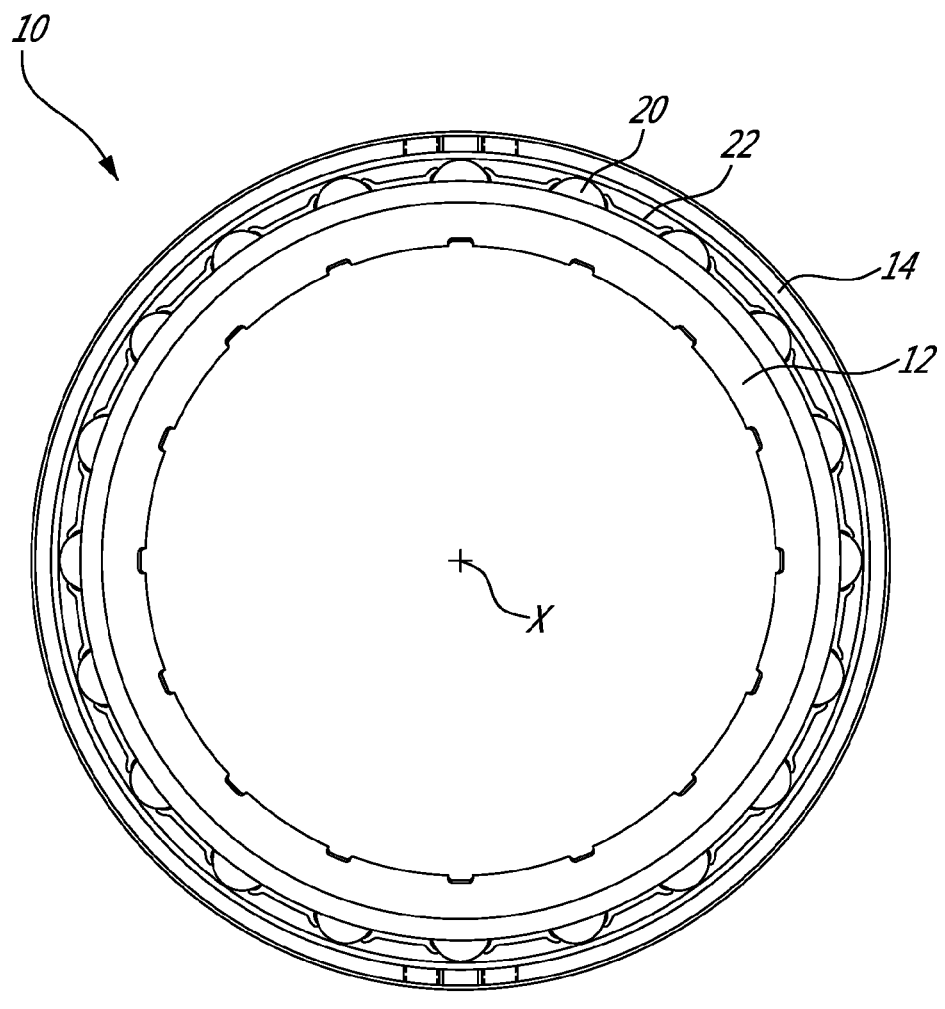
FIG. 1 is a schematic front view of a bearing assembly in accordance with a particular embodiment.
Figure 2:
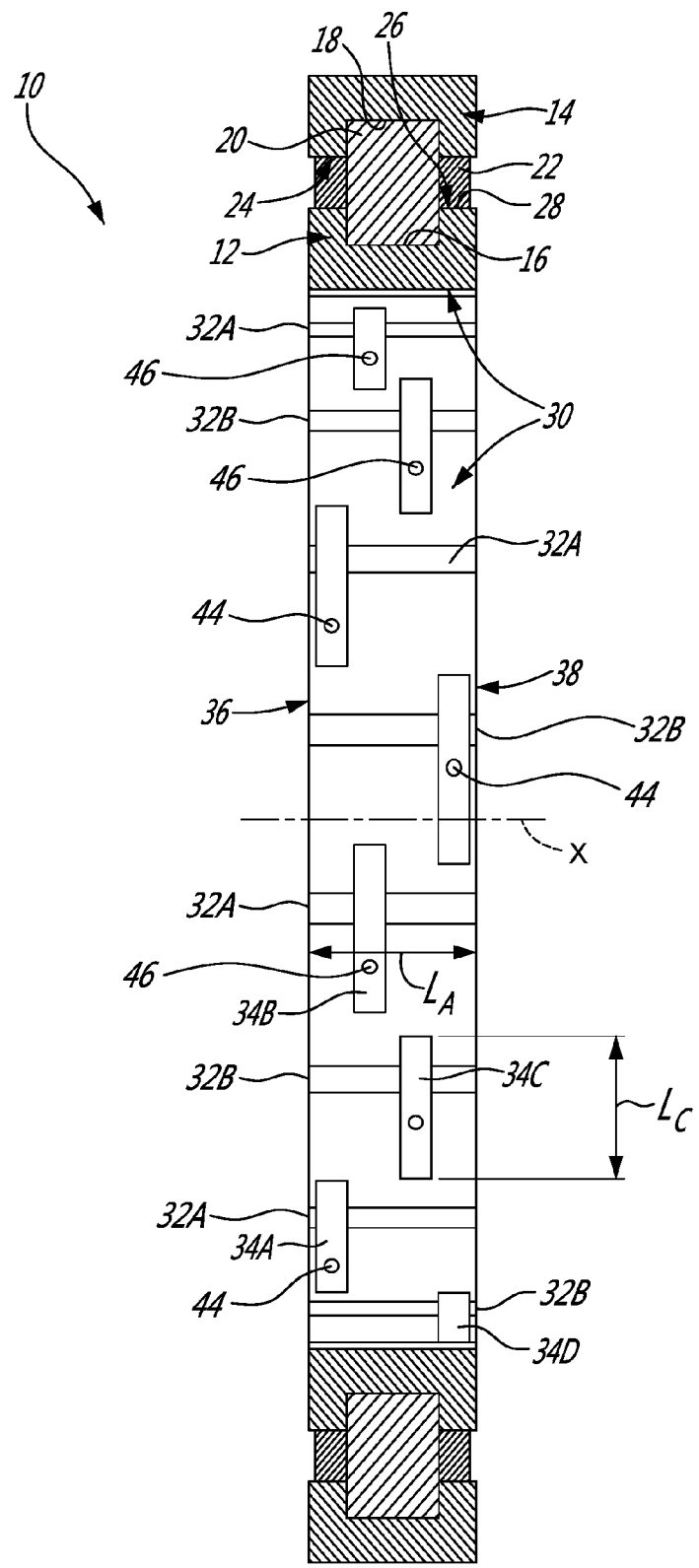
FIG. 2 is a schematic cross-sectional side view of the bearing assembly of FIG. 1.

Referring to FIGS. 1-2, a bearing assembly 10 in accordance with a particular embodiment is shown. According to an embodiment, the bearing assembly 10 is a high speed bearing, in that it may rotate in excess of 2.0 MDN (bearing bore diameter in millimeters times speed in rpm divided by one million), although it may be used in bearing assemblies operating at lesser speeds. The bearing assembly 10 generally includes concentric inner and outer rings 12, 14 respectively defining complementary inner and outer races 16, 18, in which a plurality of bearing elements 20 retained by a cage member 22 are received to allow relative rotation between the inner and outer rings 12, 14. In the embodiments shown, the bearing elements 20 are roller bearings, but it is understood that other adequate types of bearing elements can alternately be used, such as for example ball bearings and tapered bearings. The cage member 22 is received between the inner and outer rings 12, 14 and equally spaces the bearing elements 20 apart such that each bearing element 20 rotates around the inner and outer races 16, 18 without contacting the other bearing elements 20.

Referring more particularly to FIG. 2, the outer ring 14 has a ring body that is centered on a central axis X of the bearing assembly 10, with the outer race 18 being defined on an inner surface 24 thereof around its circumference. Although not shown in FIG. 2, the inner surface 24 may be at the same diameter as the outer race 18. The inner ring 12 may also be centered on the central axis X of the bearing assembly 10, with the inner race 16 being defined on an outer surface 26 thereof around its circumference. The outer surface 26 of the inner ring 12 includes two annular shoulders 28 also extending around its circumference, with the inner race 16 being defined between the shoulders 28.

Referring to FIGS. 2-5, the inner surface 30 of the inner ring 12 includes a plurality of axial slots 32 and partial circumferential slots 34 defined therein. In the figures, the axial slots 32 may be shown as 32A and 32B, while slots 34 may be illustrated as 34A, 34B, 34C and 34D, while being concurrently referred to as slots 32 and 34 for simplicity.

The axial slots 32 have a length $L_A$ (FIGS. 2, 4 and 5) defined along the axial direction of the bearing assembly 10, a width $W_A$ (FIG. 3) defined along the circumferential direction, and a radial depth $D_A$ (FIGS. 4 and 5) defined along the radial direction. In the embodiment shown in FIG. 2, the axial slots 32 are regularly spaced apart around the circumference of the inner ring 12, and each axial slot 32 extends straight across the inner surface 30 from a first axial face 36 to a second axial face 38 of the inner ring 12. For example, the slots 32 alternate between in a 32A-32B-32A-32B- . . . sequence. All the axial slots 32 may have a same width $W_A$. Other configurations are also possible.

Figure 3:
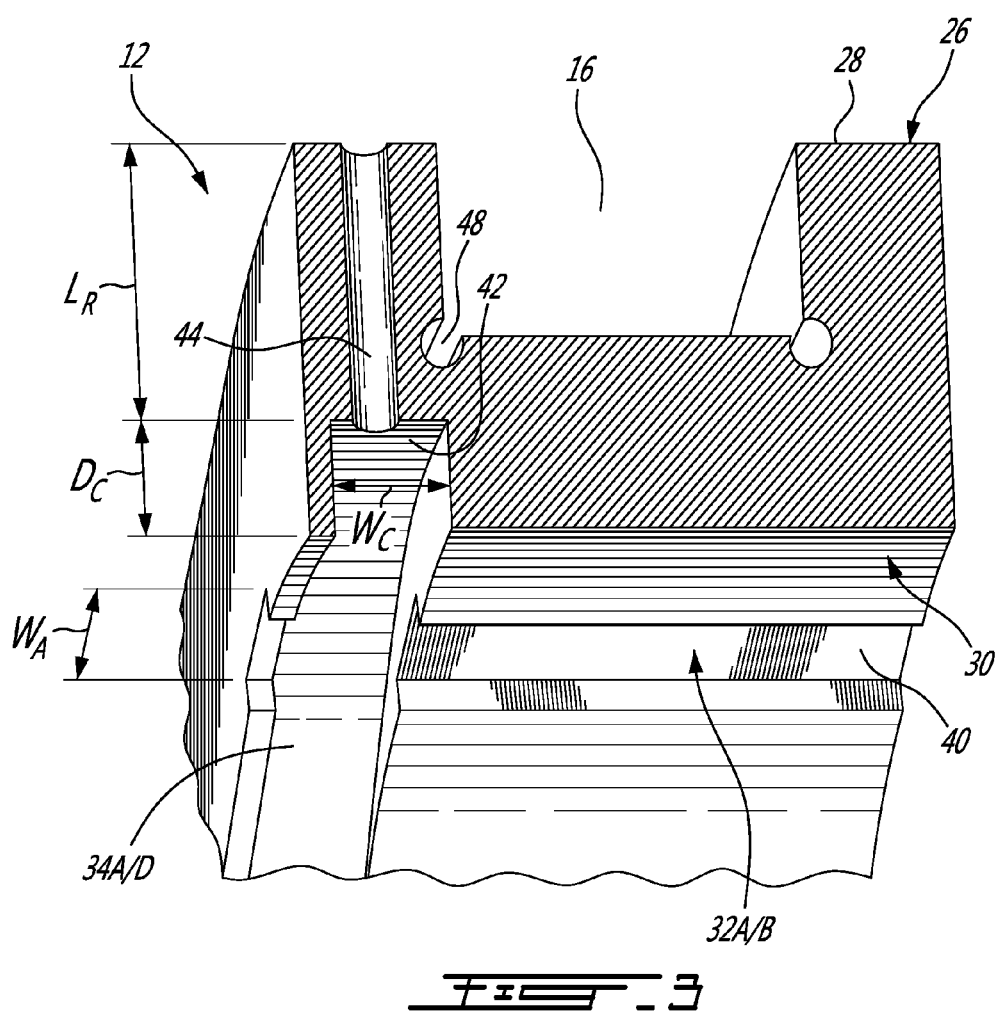
FIG. 3 is a schematic tridimensional view of a cross-section of part of an inner ring of the bearing assembly of FIG. 1.
Figure 4:
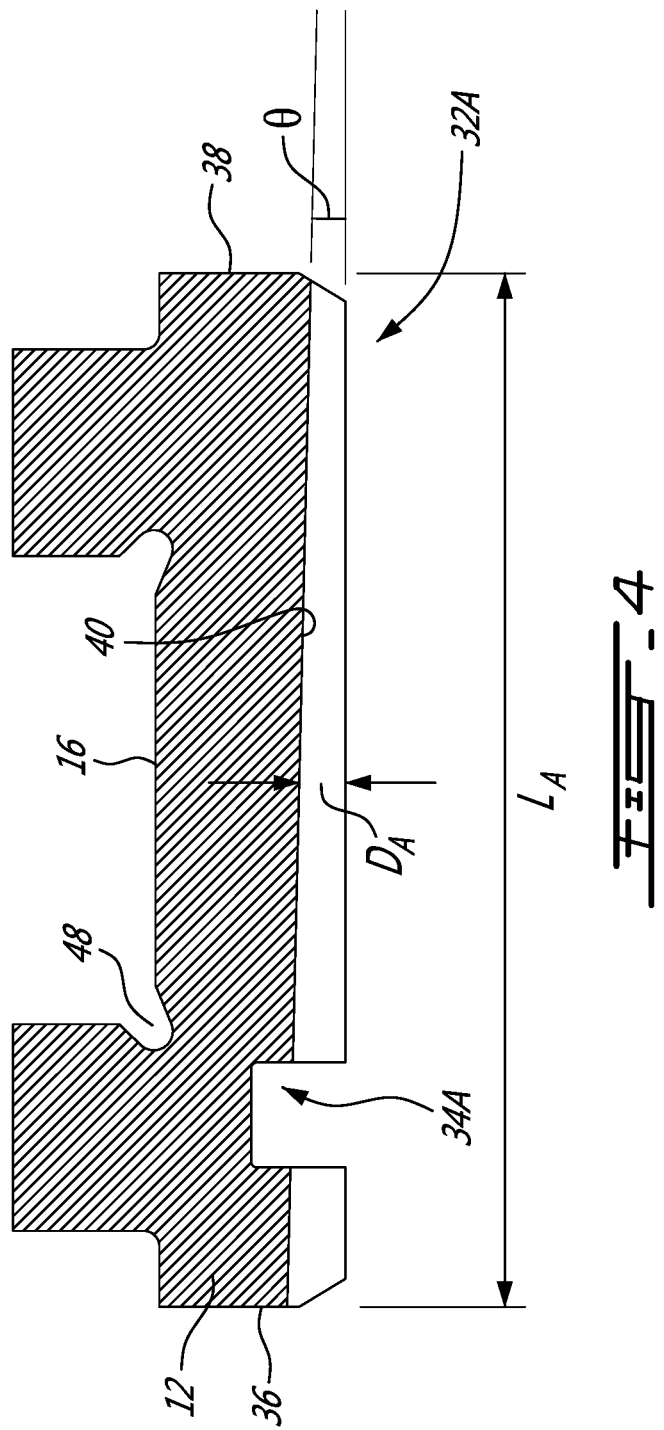
FIG. 4 is a cross-sectional view of part of the inner ring of FIG. 3 showing a first axial slot.
Figure 5:
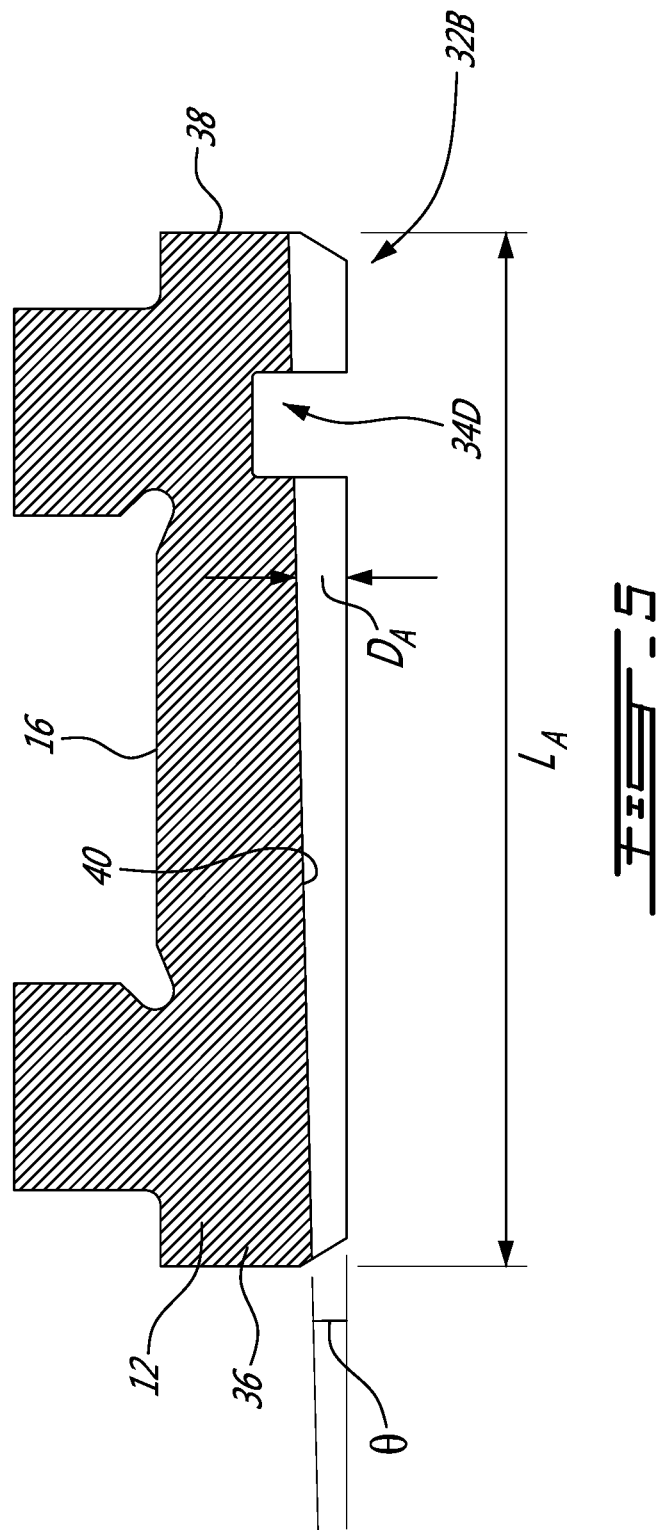
FIG. 5 is a cross-sectional view of part of the inner ring of FIG. 3 showing a second axial slot.

As can be seen more clearly in FIGS. 3-5, the axial slots 32 have a cross-section defining a flat bottom wall 40. In the embodiment shown, the axial slots 32 have a rectangular cross-section, and are defined with a depth $D_A$ varying across their length $L_A$. As shown in FIGS. 4 and 5, the axial slots 32 are angled relative to a rotational axis of the bearing assembly 10, shown as central axis X in FIG. 1. In FIG. 4, the axial slot 32A is angled such that the depth $D_A$ increases from the second axial face 38 to the first axial face 36. The depth $D_A$ may increase in linear fashion, as in FIG. 4, from face to face or at least to the respective circumferential slot 34. However, other depth variations may be present, for example by way of an arcuate shape to the bottom wall 40. Likewise, in FIG. 5, the axial slot 32B is angled such that the depth $D_A$ increases from the first axial face 36 to the second axial face 38. Again, the depth $D_A$ may increase in linear fashion, as in FIG. 5. However, other depth variations may be present, for example by way of an arcuate shape to the bottom wall 40. The variation in depth $D_A$ in the slots 32A and 32B may be the same, such that the slots 32A and 32B are mirror images of one another. The depth variation $D_A$, when linear, may be depicted by angle $\ominus$ having an angle of 1° 15'±0° 15', as an example, relative to the central axis X. The arrangement of slots 32A and 32B is such that the partial circumferential slots 34 are located at the deeper portion of the slots 32. Therefore, taking the example of FIG. 4, if pressurized lubricant is fed to the axial slot 32A via the second axial face 38, centrifugal forces on the lubricant will collaborate with the favorable angle $\ominus$ to assist in directing the lubricant to the partial circumferential slot 34A, distally located. If, alternatively, pressurized lubricant is fed to the axial slot 32A via the first axial face 36, the proximity between the first axial face 36 and the partial circumferential slot 34A is such that the pressure of the lubricant will direct it to the partial circumferential slot 34A, proximally located, in spite of the unfavorable angle $\ominus$. The same action may occur if the partial circumferential slot is of the 34B kind. Now taking the example of FIG. 5, if pressurized lubricant is fed to the axial slot 32B via the first axial face 36, centrifugal forces on the lubricant will collaborate with the favorable angle $\ominus$ to assist in directing the lubricant to the partial circumferential slot 34D, distally located. If pressurized lubricant is fed to the axial slot 32B via the second axial face 38, the proximity between the second axial face 38 and the partial circumferential slot 34D is such that the pressure of the lubricant will direct it to the partial circumferential slot 34D, proximally located, in spite of the unfavorable angle $\ominus$. The same action may occur if the partial circumferential slot is of the 34C kind. Therefore, by having slots 32A and 32B in the inner ring 12, for instance in the alternating sequence 32A-32B-32A-32B-etc or in any other sequence, allows the inner ring 12 to be reversible, i.e., not to have an orientation. The inner ring 12 may also be symmetrical, for example in the case of the alternating sequence 32A-32B-32A-32B-etc.

As observed in FIGS. 2-5, the partial circumferential slots 34 are off-centered relative to the axial dimension. However, some if not all of the circumferential slots 34 may be substantially centered in the axial dimension. As illustrated, the inner ring 12 has two half portions of equal axial lengths relative to the central axis X. One of the half portions extends axially forward from a first of the axial faces 38. The other of the half portions extends axially rearward from a second of the axial faces 36. When off-centered, as in FIGS. 2-5, the partial circumferential slots 34 may be located in one of the half portions of the inner ring 12 in which the slots 32A and 32B are deeper, as explained in detail above for FIGS. 4 and 5. The slots 34A and 34D, as explained below, are substantially closer to the first end 36 and to the second end 38, respectively, than to the second end 38 and to the first end 36, respectively.

The partial circumferential slots 34 have a length $L_C$ (FIG. 2) defined along the circumferential direction of the bearing assembly 10, a width $W_C$ defined along the axial direction, and a depth $D_C$ defined along the radial direction. The partial circumferential slots 34 may have a depth $D_C$ varying across their length, defined by an arcuate bottom wall 42 (e.g., circular) having a center of curvature offset from the central axis X of the bearing assembly 10 and a smaller radius than that of the inner surface 30 of the inner ring 12. The partial circumferential slots 34 may also have a rectangular cross-section defined perpendicularly to their length $L_C$. Each partial circumferential slot 34 extends circumferentially across and in fluid communication with a respective one of the axial slots 32, around a portion of the circumference greater than that of the respective axial slot 32 such as to extend circumferentially therefrom, i.e. the length $L_C$ of each partial circumferential slot 34 is greater than the width $W_A$ of the corresponding axial slot 32. In the embodiment shown, all the partial circumferential slots 34 have a same length $L_C$ and have a same maximum depth $D_C$. Alternately, partial circumferential slots 34 with different geometries from one another may be provided.

The partial circumferential slots 34 may be disposed into four sets: first and second sets 34A, 34B closer to the first axial face 36 of the inner ring 12, axially offset from one another with the first set 34A being closest to the first axial face 36, and third and fourth sets 34C, 34D closer to the second axial face 38 of the inner ring 12, axially offset from one another with the fourth set 34D being closest to the second axial face 38. In the embodiment shown, each set 34A, 34B, 34C, 34D includes the same number of partial circumferential slots 34, and the slots 34 are equally spaced apart circumferentially and disposed such as to alternate between the four sets 34A, 34B, 34C, 34D around the circumference of the inner ring 12, i.e. the partial circumferential slots 34 from the four sets 34A, 34B, 34C, 34D are staggered. The axial distance between the partial circumferential slots 34A and the first axial face 36 of the inner ring 12 and the axial distance between the partial circumferential slots 34D and the second axial face 38 of the inner ring 12 may be the same. The axial distance between the partial circumferential slots 34B and the first axial face 36 of the inner ring 12 and the axial distance between the partial circumferential slots 34C and the second axial face 38 of the inner ring 12 may be the same. Other configurations are of course possible. In the particular embodiment shown, each set A, B, C, D includes four partial circumferential slots 34 for a total of sixteen partial circumferential slots 34, and sixteen axial slots 32 are provided; alternately, more or less slots 32, 34 may be provided.

The axial and partial circumferential slots 32, 34 extend radially into the inner ring 12 without penetrating the outer surface 26 and the inner race 16 defined therein. Each axial slot 32 extends radially into the inner ring 12 a distance less than that of the corresponding partial circumferential slot 34, i.e. the depth $D_A$ of the axial slots 32 is smaller than the maximum depth $D_C$ of the partial circumferential slots 34.

Referring to FIGS. 2-3, the inner ring 12 also includes a plurality of radial holes 44, 46 defined therethrough, with one radial hole 44, 46 extending from each partial circumferential slot 34 in fluid communication therewith. The radial holes 44, 46 have a length $L_R$ (FIG. 3) defined along the radial direction. Each radial hole 44, 46 is circumferentially offset with respect to the axial slot 32 crossing the partial circumferential slot 34 in which the radial hole 44, 46 is defined, i.e. the radial hole 44, 46 is located in the portion of the partial circumferential slot 34 extending from the axial slot 32.

The radial holes 44, 46 are defined as shoulder radial holes or race radial holes depending on their position. Referring particularly to FIG. 3, each partial circumferential slot 34A and 34D has a shoulder radial hole 44 extending from the surface of its bottom wall 42, the shoulder radial holes 44 extending through the inner ring 12 to the outer surface 26 along one of the shoulders 28 bordering the inner race 16. The shoulder radial holes 44 feed the lubricating fluid to the cage piloting surface at the shoulder 28. In a particular embodiment, the shoulder radial holes 44 are positioned such as to be overlapped by the cage member 22 in any position thereof when the bearing elements 20 are received within the inner race 16.

Moreover, each partial circumferential slot 34B and 34C has a race radial hole 46 extending from the surface of its bottom wall 42, the race radial holes 46 extending through the inner ring 12 to a corner of the inner race 16. In the embodiment shown, a circumferential groove 48 is defined along each corner of the inner race 16, and the race radial holes 46 extend to the respective one of these two grooves 48. The race radial holes 46 provide lubricating fluid directly to the bearing element 20 and the inner race contact interface.

In a particular embodiment, all the radial holes 44, 46 have the same diameter, and have a constant diameter across their length $L_R$, i.e. from the communication with the corresponding partial circumferential slot 34 to the communication with the surface of the shoulder 28 or with the corner of the inner race 16. In a particular embodiment, the radial holes 44, 46 include a same number of the race radial holes 46 and of the shoulder radial holes 44.

The partial circumferential slots 34, axial slots 32, and radial holes 44, 46 function together as a series of fluid passages to deliver lubricating fluid to the bearing assembly 10. Once the inner ring 12 has been mounted to a shaft, lubricating fluid is circulated to the inner ring 12, for example from a radial scoop or an axial scoop depending on the space available for the bearing assembly 10. The lubricating fluid is first circulated axially along the inner surface 30 of the inner ring 12 following a plurality of distinct first paths defined by the axial slots 32, then from these first paths following a plurality of distinct second paths defined by the partial circumferential slots 34. The lubricating fluid is then circulated radially from the partial circumferential slots 34A and 34D through the inner ring 12 directly to the shoulders 28 receiving the cage member 22, through the shoulder radial holes 44, and radially from the partial circumferential slots 34B and 34C through the inner ring 12 directly to the corners of the inner race 16, through the race radial holes 46.

Therefore, a method of lubricating a bearing assembly comprises circulating a lubricating fluid axially and radially outwardly along a first set of the axial slots 32A in the inner surface of the inner ring 12 of the bearing assembly 10 to distally-located partial circumferential slots 34A, 34B in the inner ring 12, and simultaneously circulating the lubricating fluid axially and radially inwardly along a second set of the axial slots 32B in the inner surface of the inner ring 12 of the bearing assembly 10 to proximally-located partial circumferential slots 34C, 34D in the inner ring 12. The lubricating fluid, in a pressurized condition, may be received solely at the axial face 38 of the inner ring 12. Circulating the lubricating fluid axially and radially outwardly comprises circulating the lubricating fluid at an angle of 1° 15'±0° 15' outward relative to a rotational axis of the bearing assembly. Circulating the lubricating fluid axially and radially inwardly comprises circulating the lubricating fluid at an angle of 1° 15'±0° 15' toward a rotational axis of the bearing assembly. Circulating the lubricating fluid comprises circulating the lubricating fluid in an equal number of the first set of the axial slots than the second set of the axial slots.

The above description is meant to be exemplary only, and one skilled in the art will recognize that changes may be made to the embodiments described without departing from the scope of the invention disclosed. For example, the bearing assembly 10 is used as a high speed bearing to support the compressor shaft or the turbine shaft of a gas turbine engine. The axial slots 32 may not extend all the way to the distal axial faces 36 or 38, but would be extend only to the related distal partial circumferential slots 34, although this would impact the reversibility of the inner ring 12. Still other modifications which fall within the scope of the present invention will be apparent to those skilled in the art, in light of a review of this disclosure, and such modifications are intended to fall within the appended claims.

The invention claimed is:

1. A bearing assembly comprising:
an outer ring defining a central axis of rotation for the bearing assembly;
an inner ring disposed radially inwardly of the outer ring and cooperating therewith to form a roller volume, the inner ring having opposed axial faces and including axial slots formed in, extending axially along and circumferentially spaced around an inner circumferential surface, each said axial slots extending axially to openings in the opposed axial faces of the inner ring and communicating with a respective partial circumferential slot defined in the inner circumferential surface and being in fluid communication with the roller volume through a respective passage in the inner ring, the inner ring having half portions of equal axial lengths, one of the half portions extending axially forward from a first of the axial faces, the other of the half portions extending axially rearward from a second of the axial faces, a first plurality of the axial slots having a radial depth increasing from the first of the axial faces to at least the respective partial circumferential slot, the partial circumferential slots that communicate with the first plurality of the axial slots being located in the other of the half portions, and a second plurality of the axial slots having a radial depth increasing from the second of the axial faces to at least the respective partial circumferential slot, the partial circumferential slots that communicate with the second plurality of the axial slots being located in the one of the half portions; and bearing elements in the roller volume rollingly disposed against an inner circumferential surface of the outer ring and an outer circumferential surface of the inner ring, the bearing elements allowing relative rotational motion between the outer ring and the inner ring.

2. The bearing assembly according to claim 1, wherein the inner ring has an alternating sequence of the axial slots of the first plurality and of the second plurality.

3. The bearing assembly according to claim 1, wherein the radial depth increases linearly.

4. The bearing assembly according to claim 3, wherein the axial slots define an angle of 1 ° 15'±0° 15' relative to a rotational axis of the bearing assembly.

5. The bearing assembly according to claim 1, wherein the inner ring has an equal number of said axial slots in the first plurality and in the second plurality.

6. The bearing assembly according to claim 1, wherein the inner ring is symmetrical relative to a plane to which a rotational axis of the inner ring is normal and separating the inner ring in half.

7. The bearing assembly according to claim 1, wherein the bearing elements are rollers.

8. An inner ring of a bearing assembly comprising a ring body configured to be disposed radially inwardly of an outer ring of the bearing assembly and cooperating therewith to form a roller volume configured for receiving roller bearing elements allowing relative rotational motion between the outer ring and the inner ring, the inner ring having opposed axial faces and including axial slots formed in, extending axially along and circumferentially spaced around an inner circumferential surface of the ring body, each said axial slots extending axially to openings in the opposed axial faces of the inner ring and communicating with a respective partial circumferential slot defined in the inner circumferential surface and being in fluid communication with the roller volume through a respective passage in the inner ring, the inner ring having half portions of equal axial lengths, one of the half portions extending axially forward from a first of the axial faces, the other of the half portions extending axially rearward from a second of the axial faces, a first plurality of the axial slots having a radial depth increasing from the first of the axial faces to at least the respective partial circumferential slot, the partial circumferential slots that communicate with the first plurality of the axial slots being located in the other of the half portions, and a second plurality of the axial slots having a radial depth increasing from the second of the axial faces to at least the respective partial circumferential slot, the partial circumferential slots that communicate with the second plurality of the axial slots being located in the one of the half portions.

9. The inner ring according to claim 7, further comprising an alternating sequence of the axial slots of the first plurality and of the second plurality.

10. The inner ring according to claim 7, wherein the radial depth increases linearly.

11. The inner ring according to claim 10, wherein the axial slots define an angle of 1° 15'±0° 15' relative to a rotational axis of the bearing assembly.

12. The inner ring according to claim 7, wherein the inner ring has an equal number of said axial slots in the first plurality and in the second plurality.

13. The inner ring according to claim 7, wherein the inner ring is symmetrical relative to a plane to which a rotational axis of the inner ring is normal and separating the inner ring in half.

14. A method of lubricating a bearing assembly comprising:

circulating a lubricating fluid axially and radially outwardly from a first axial face and along a first plurality of axial slots in an inner surface of an inner ring of the bearing assembly to distally-located partial circumferential slots located in one of two half portions of the inner ring, the one of the two half portions extending from a second axial face of the inner ring toward the first axial face of the inner ring; and circulating the lubricating fluid axially and radially inwardly from the first axial face along a second plurality of axial slots in the inner surface of the inner ring of the bearing assembly to proximally-located partial circumferential slots located in the other of the two half portions of the inner ring, the other of the two half portions extending from the first axial face of the inner ring toward the second axial face and having an axial length equal to that of the one of the two half portions.

15. The method according to claim 14, further comprising receiving the lubricating fluid solely at the first axial face of the inner ring.

16. The method according to claim 14, wherein circulating the lubricating fluid axially and radially outwardly comprises circulating the lubricating fluid at an angle of 1° 15'±0° 15' outward relative to a rotational axis of the bearing assembly.

17. The method according to claim 14, wherein circulating the lubricating fluid axially and radially inwardly comprises circulating the lubricating fluid at an angle of 1° 15'±0° 15' toward a rotational axis of the bearing assembly.

18. The method according to claim 14, wherein circulating the lubricating fluid comprises circulating the lubricating fluid in an equal number of the first plurality of the axial slots than the second plurality of the axial slots.

\* \* \* \* \*